Patented Mar. 8, 1932

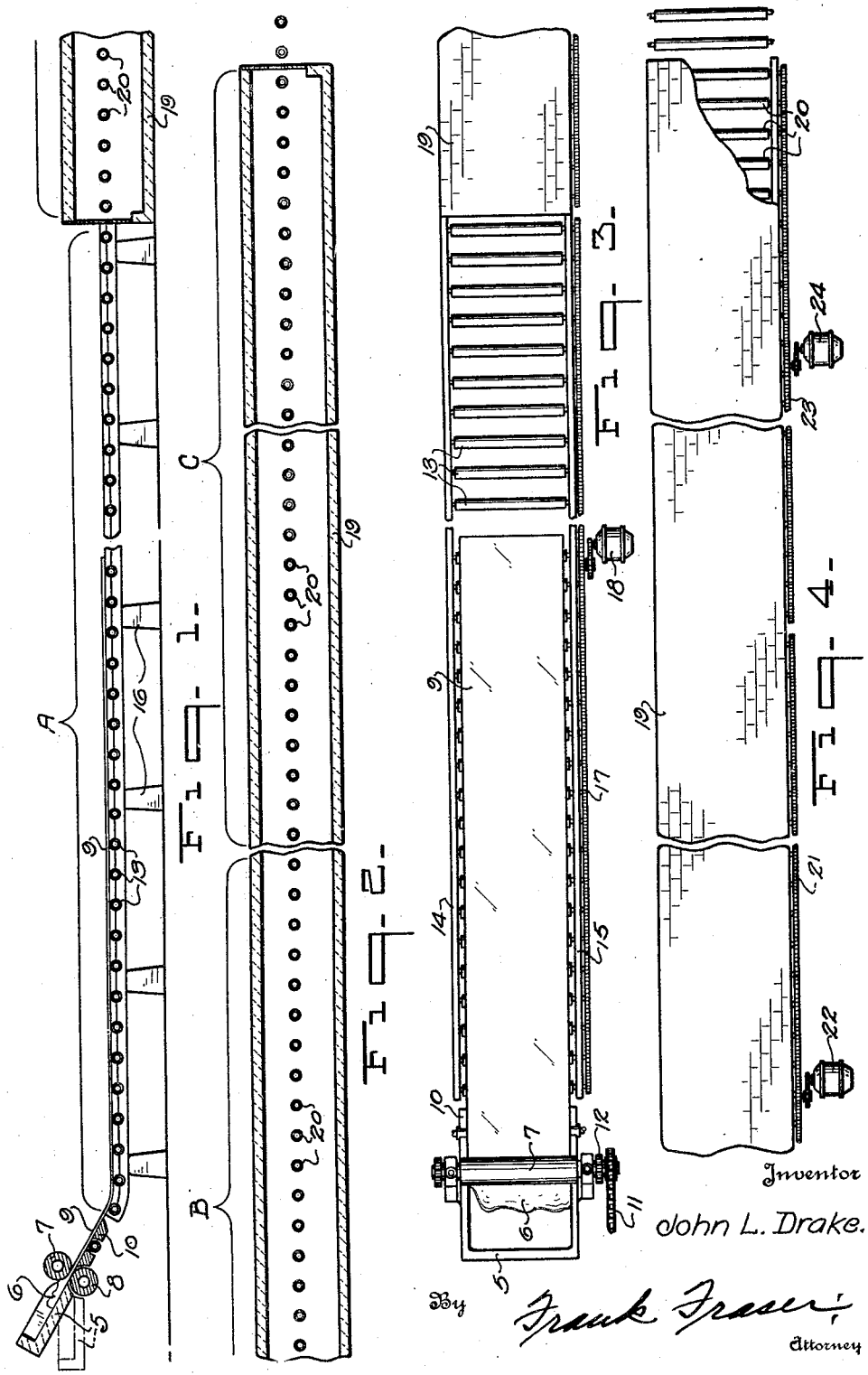

1,848,116

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed September 18, 1929. Serial No. 393,459.

The present invention relates to an improved process and apparatus for forming and annealing sheet or plate glass.

According to the invention, a plurality of successive sheets of glass are adapted to be formed by an intermittent casting and rolling operation after which said sheets are gradually reduced in temperature by passing them through an annealing leer. It is desirable, in order to increase production and improve the quality of the glass sheets, that they be formed at a relatively high rate of speed such as for example, approximately sixty feet per minute, although this speed may be increased or decreased if preferred. A considerable length of time is ordinarily required to properly anneal the glass sheets so that were the sheets carried entirely through the leer at the same high rate of speed at which they were formed, it will be apparent that the leer would necessarily have to be of considerable length. However, it is preferred, although not necessary, that the annealing operation be a continuous one or, otherwise stated, that the glass be kept in constant motion after being formed until it is properly annealed or at least until it has become substantially set.

The object of this invention, broadly stated, is in the provision of a process and apparatus wherein the glass sheets may be formed at a relatively high rate of speed and subsequently continuously annealed while traveling at a speed relatively less than the forming speed. Thus, the process and apparatus herein provided is intended to embody those advantages incident to the rapid reduction of the molten glass to sheet form and likewise, those advantages which result from slower annealing of the glass.

Another object of the invention is the provision of such a process and apparatus wherein successive sheets of glass are formed and carried continuouly forwardly into and through an annealing leer, the glass sheet being caused to travel at variable speeds subsequent to its formation but prior to the annealing thereof in such a manner as to improve the quality of the glass and facilitate the annealing thereof by obviating any tendency of said sheet to sag before it has become substantially set.

A further object of the invention is to provide such a process and apparatus wherein the glass sheet is formed at a relatively high rate of speed, and after being completely formed, its speed of travel is progressively increased so as to maintain the sheet under a predetermined tension until it has become substantially set, after which the speed is reduced and the sheet carried through an annealing leer at a speed relatively less than its speed of formation.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through the forward end portion of apparatus provided by the present invention, Fig. 2 is a similar view showing the rear end portion of the apparatus, and Figs. 3 and 4 are plan views of Figs. 1 and 2 respectively.

Referring to the drawings, the numeral 5 designates a receptacle or support for receiving thereupon the mass of molten glass 6 to be reduced to sheet form. The molten glass 6 is preferably deposited upon the support 5 when the same is in a substantially horizontal position as indicated by the broken lines in Fig. 1, after which said support is adapted to be tilted to its full line position so that the molten glass will be moved therefrom between the sheet forming rolls 7 and 8 spaced from one another to create a sheet forming pass therebetween. The glass sheet 9 issuing from between the forming rolls 7 and 8 is received upon an inclined runway 10 provided to guide and support the sheet during its inclined downward travel. The forming rolls 7 and 8 serve to reduce the molten glass 6 to a sheet of substantially predetermined and uniform thickness.

It is desirable, as pointed out above, that the glass sheet be formed at a relatively high rate of speed and to this end, the rolls 7 and 8 are rotated in a manner that their peripheral speed will be such that they will act to rapidly reduce the molten glass 6 to sheet form. One of the forming rolls is preferably positively driven such as through a chain drive 11 and the other roll is driven from the positively driven roll by means of intermeshing gears 12 which are keyed to the shafts carrying the forming rolls.

Positioned to receive the sheet 9 from the inclined runways 10 is a conveyor table or receiving conveyor section A composed of a plurality of horizontally aligned rolls 13, carried by shafts which are rotatably mounted within the spaced longitudinally extending side members 14 and 15, supported by the vertical uprights 16. The rolls 13 are all adapted to be driven in unison at the same speed, and to accomplish this, the shaft supporting each roll 13 may have keyed thereto a sprocket (not shown) and about all of the sprockets may be trained a sprocket chain 17 driven from a variable speed motor 18. Arranged in alignment with the receiving section A is a leer 19 within which are mounted a large number of rolls 20 in horizontal alignment with the rolls 13 of conveyor table A.

The rolls 20 in leer 19 are divided into two units or sections B and C, the section B being termed the transfer or intermediate section, and C, the annealing section. The rolls 20 of the intermediate section B are driven in unison at the same speed by a chain drive 21 driven from a variable speed motor 22, while the rolls of section C are similarly driven by a chain drive 23 from a motor 24. The rolls 13 of the receiving section A are adapted to be driven at a speed equal to the speed of rolling of the sheet and also at a higher speed than the speed of rolling. The rolls of the transfer section B are adapted to be driven at a speed relatively higher than the high speed of the receiving section and also at a speed relatively less than the speed of formation of the sheet, while the rolls of the annealing section C are adapted to be driven at a constant rate of speed which is substantially less than the speed of formation of the sheet and approximately equal to the slow speed of section B. Thus, it might be said that the sections A and B constitute variable speed conveyor sections, while the section C constitutes a constant speed conveyor section.

In carrying the invention into practice, the molten glass 6 is first deposited upon the receiver 5 and subsequently passed through the forming rolls 7 and 8 and reduced to sheet form. The sheet 9 is preferably rolled at a relatively high rate of speed for example, approximately sixty feet per minute. During the formation of the sheet, the rolls of the receiving section A are adapted to travel at the same speed to receive the glass sheet from runway 10. After the entire sheet is deposited upon the receiving section A, the speed thereof is increased, for example, to from 250 to 300 feet per minute. During this increased speed of section A, the rolls of section B are traveling at between 301 to 310 feet per minute so that as the glass sheet passes from section A to section B, it will be placed under a tension sufficient to prevent sagging of the sheet before it has become substantially set. After the glass sheet has become substantially set, however, the speed of section B is materially reduced to between 5 to 15 feet per minute and the sheet transferred at this speed onto the annealing section C, the speed of the annealing section being always maintained constant at a speed substantially equal to the slow speed of section B. The relative speeds of the conveyor sections, as above described, are merely given by way of example, and it will be apparent that various speeds may be used to accomplish the purposes of the present invention.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for forming and annealing sheet glass, means for reducing a mass of molten glass to sheet form, an annealing leer, and conveying means for receiving the sheet from the forming means and carrying it into and through said leer including a receiving section adapted to travel at the speed of formation of the sheet and also at a higher speed, a transfer section adapted to travel at a speed greater than the high speed of the receiving section and also at a relatively slower speed, and an annealing section adapted to travel at a constant speed approximately equal to the slow speed of said transfer section.

2. In apparatus for forming and annealing sheet glass, means for reducing a mass of molten glass to sheet form, an annealing leer, and conveying means for receiving the sheet from the forming means and carrying it into and through said leer including a receiving section, means for driving said section at the speed of formation of the sheet and also at a higher speed, a transfer section for receiving the sheet from the receiving section, means for driving the transfer section at a speed greater than the high speed of the receiving section and at a relatively slower speed, an annealing section for receiving the sheet from the transfer section, and means for driving the annealing section at a constant speed approximately equal to the slow speed of the transfer section.

3. The process of forming and annealing sheet glass, consisting in reducing a mass of molten glass to sheet form, carrying the sheet away from the forming means at forming speed, increasing the speed of the sheet in its forward movement, then transferring the sheet to a conveyor mechanism adapted to still further increase the speed of the sheet, and then materially reducing the forward movement of the sheet and annealing the same.

4. The process of forming and annealing sheet glass, consisting in reducing a mass of molten glass to sheet form at a relatively high rate of speed, carrying the sheet forward on a conveyor at the same speed, then, after the sheet has been completely formed, increasing the speed of the conveyor and consequently the speed of the sheet, transferring the sheet to a second conveyor operated to still further increase the forward movement of the sheet, then, after the sheet has become substantially set, materially reducing the speed of the conveyor, and advancing the sheet at the materially reduced speed to anneal the same.

5. The process of forming and annealing sheet glass, consisting in reducing a mass of molten glass to sheet form at a relatively high rate of speed, then, after the sheet is completely formed, increasing the speed of the forward movement thereof at least two successive times, and then materially reducing the forward movement of the sheet and subjecting it to annealing conditions so that the glass will be annealed while being carried forward at such reduced speed.

6. In apparatus for forming and annealing sheet glass, means for reducing a mass of molten glass to sheet form, an annealing leer, conveying means for receiving the sheet from the forming means and carrying it into and through said leer including a receiving section, means for driving said section at the speed of sheet formation and also at a higher speed, a transfer section, means for driving said section at a speed higher than the high speed of the receiving section, said means also being capable of driving said section at a materially slower speed, and an annealing section adapted to travel at a constant speed approximately equal to the slow speed of the transfer section.

Signed at Toledo, in the county of Lucas and State of Ohio, this 30th day of August 1929.

JOHN L. DRAKE.